Aug. 30, 1960  J. E. RHODES, JR  2,950,648
MICROSCOPE FOR VIEWING SUBSTANTIALLY TRANSPARENT OBJECTS
Filed March 3, 1954  2 Sheets-Sheet 1
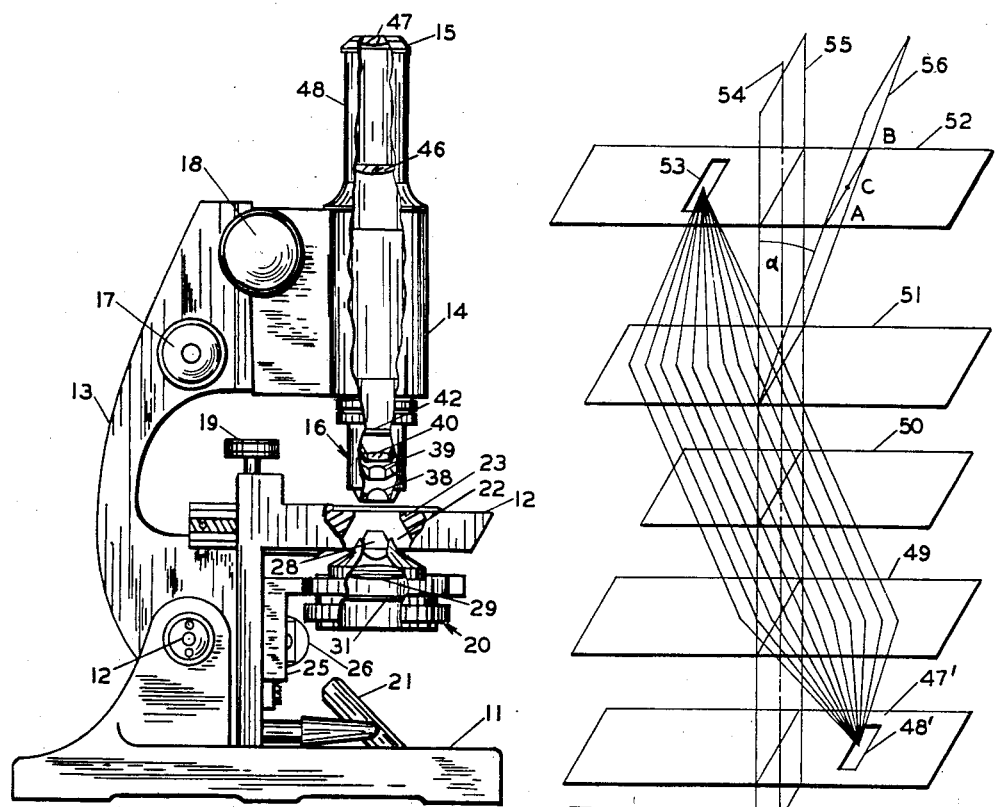
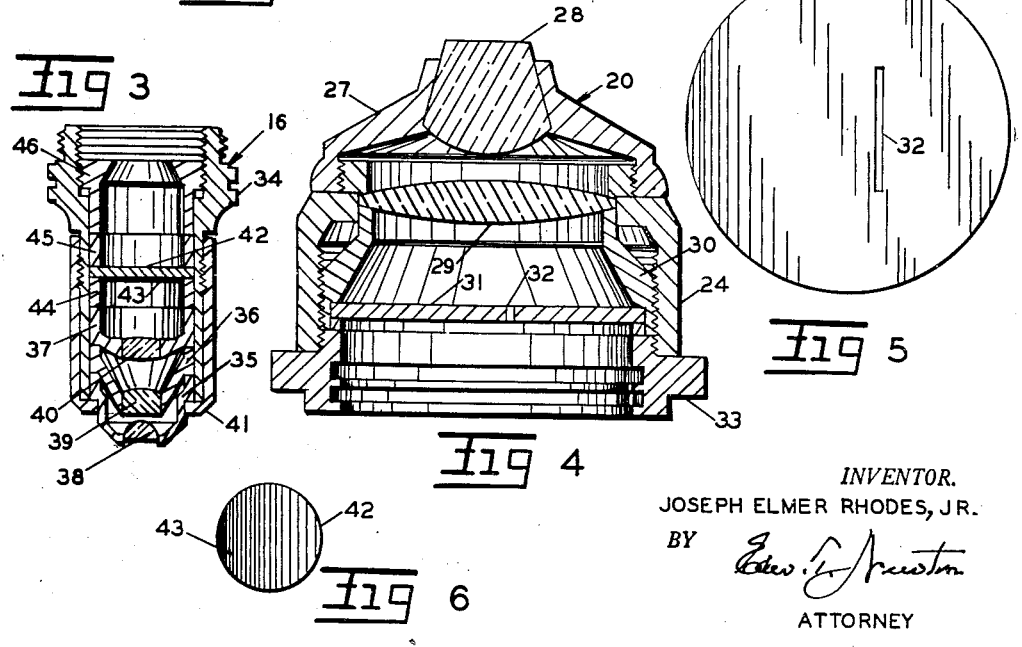
INVENTOR.
JOSEPH ELMER RHODES, JR.
BY
ATTORNEY

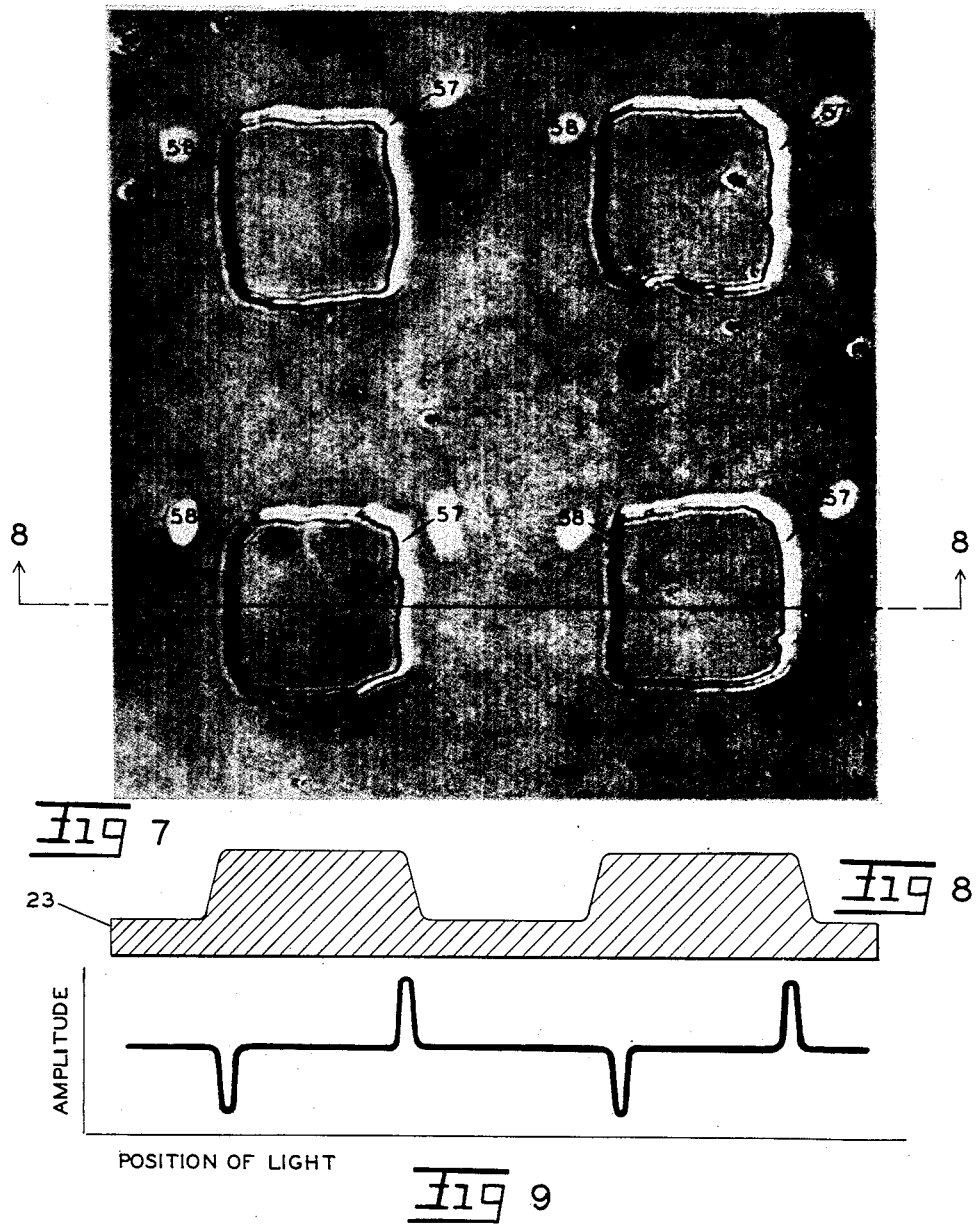

United States Patent Office 2,950,648
Patented Aug. 30, 1960

2,950,648

MICROSCOPE FOR VIEWING SUBSTANTIALLY TRANSPARENT OBJECTS

Joseph Elmer Rhodes, Jr., Marietta, Ga., assignor to Georgia Tech Research Institute, Atlanta, Ga., a corporation of Georgia Filed Mar. 3, 1954, Ser. No. 413,798

7 Claims. (Cl. 88—39)

This invention relates to microscopes and more particularly to an optical system or microscope for viewing substantially transparent objects wherein variation in optical thicknesses of transparent objects is observed.

In the past, optical systems of conventional microscopes have been designed to produce an image which is as nearly an exact replica of the object as possible. The light in the image, i.e. the real image formed by the objective lens system or the real image on the retina of the eye formed by the lenses, reproduces in relative intensity, point by point, the light emanating from the surface of the object. Geometric similarity is maintained between the object and the image in a conventional microscope but the relative sizes are seldom the same.

It is thus apparent that when a transparent object is viewed through a conventional microscope, the image formed contains no contrast of light, and hence even the presence of the object itself is not discernible; therefore, in order to examine these transparent objects, it is necessary to resort to a method of "staining," wherein the appearance of the transparent object is altered and contrast is artificially introduced. The practice of staining has attained wide acceptance, particularly in the field of biological specimens such as Rickettsia, cocci, bacteria and the like; however, in most instances, these living organisms are killed by the dye.

Recently, it has been found that differences in the optical thickness of an object, as well as differences in the actual thickness and transparency may affect the ability to view an object, and thus an alternative method of examining transparent objects in their natural condition has been developed. This alternative method is known as "phase contrast microscopy" and is the general class to which the present invention relates. In certain phase contrast microscopes, the light which emanates from an object and passes through various lenses is altered by causing a phase shift in part of the light emanating from a single point source on the object. Indeed, almost any tampering with the light between the object and image in a conventional microscope will produce variations in intensity in the image which correspond in some way to the variations in the optical thickness in the object.

Some of the prior art methods of effecting phase contrast include slight defocusing of a conventional microscope, particularly a microscope having a narrow pencil or column of illumination. Another method of introducing phase contrast is to place "stops," or opaque shields, in the focal plane of the objective lens which in some instances in accompanied by special illumination of the object. These prior art methods are reviewed by F. Zernike in Physica, volume 9, pages 686 and 974 (1942).

The prior art methods also include the Zernike method of phase contrast microscopy wherein there is employed a 90° or 270° phase shifting plate (a piece of material whose optical thickness exceeds its geometric thickness by ¼ or ¾ of a wave length of light which retards the phase of the light in the central image by ¼ or ¾ of a period). In the Zernike method, the light diffracted by the object out of the central image is not so retarded. The central image is the image of the source of light (or illuminated hole) below the condenser, which appears in the back focal plane of the objective lens when the condenser is adjusted to illuminate the object with parallel light. The shape of the central image is not the same in all prior art phase contrast microscopes. For example, a small hole as a light source produces a spot of light while a slit produces a line, crossed slits produce a cross and a ring-shaped slit produces a ring-shaped central image. In these prior art microscopes, the phase shifting plate must be shaped to conform to this central image, whatever its shape, the most used shape being ring-shaped.

As long as the variations in optical thickness in the object are small, that is, one-tenth wave length of light or less, the image substantially "maps" this optical thickness; however, if the variations in optical thickness in the object are greater than about one-fourth wave length or more, the image, while still showing some variations of intensity, becomes very difficult or impossible to interpret. Furthermore, when objective lenses are changed, to change magnification, it is necessary to change the light source slit to match the phase ring in the new objective, and the central image and the phase shifting elements must coincide within small tolerances.

Briefly, the present invention includes placing an absorber whose transparency varies from point to point, not necessarily a phase shifter, in the back focal plane of the objective of a conventional microscope. The central image in my invention is formed as a small point or as a slit by providing a stop or opaque shield having either a small hole or a small slit at the focus of the condenser.

The operation of this invention can be explained most easily by drawing an analogy between a microscope optical system and a carrier communications system.

It is well known that in the back focal plane of a microscope objective there appears a so-called image that is the image of the aperture at the focus of the condenser. This central image is there whether there is an object on the stage or not. When an object is placed on the stage, "spectra" appear around the central image. They are formed by light diffracted by the object out of the beam or beams that contribute to the central image.

For the purpose of simplifying this explanation, consider a "one-dimensional" object, one whose optical properties vary in only one direction. Along any line perpendicular to this direction, optical properties do not vary.

As described in more detail in my article on pages 848–852, vol. 43, No. 10, of the Journal of the Optical Society of America (October 1953), the "spectra" of such objects appear on each side of the central image. The positions of details of the spectra with respect to the central image are related to the Fourier transform of a mathematical expression of what the object does to the illuminating light in a manner similar to the relation between the locations on a frequency scale of details of side bands of a modulated carrier and the Fourier transform of a mathematical expression of the modulation.

In this analogy, ordinary microscopy of objects of varying transparency corresponds to amplitude modulation of the carrier in communications. The spectra hold the same relations to the central image and the object that the side bands of an amplitude-modulated carrier hold to the carrier and the modulation.

Also in this analogy, microscopy of a transparent object of varying optical thickness corresponds to phase modulation. The spectra hold the same relation to the central image and the object that the side bands of a phase-modulated carrier do to the carrier and the modulation. In this analogy, the illuminating light corresponds to the unmodulated carrier in a communication system. What the object does to this illumination corresponds to modulation of the carrier.

Zernike's phase contrast system corresponds to one method of recovering modulation from a phase-modulated carrier. The phase modulation is turned to amplitude modulation by shifting the phase of the carrier with respect to the side bands in the communication scheme. Zernike's system shifts the phase of light in the central image with respect to light in the side spectra.

My invention corresponds to recovering phase modulation with a frequency-sensitive discriminator circuit. The discriminator is one whose response varies linearly with frequency and is normally used to recover modulation from frequency-modulated carriers. If such a discriminator is applied to a phase-modulated carrier, it will recover, not the modulation itself, but the time derivative of the modulation.

Accordingly, my varying absorber corresponds to a linear discriminator. It recovers, not the optical thickness pattern as does the Zernike system (if this pattern is not very strong, that is, if the optical thickness varies only about a tenth of a wave length), but the space derivative of the optical thickness, and this it does regardless of the size of the variations of optical thickness.

Accordingly, it is an object of the present invention to provide a microscope optical system that produces intensity variations in the image that corresponds to the slopes of the optical thickness in the object or to the rate of change of optical thickness with respect to the distance along the object.

Another object of the invention is to provide a microscope optical system which produces an image wherein there is a partial suppression of variations in intensity in the image due to variations in transparency of the object from point to point thereon.

Another object of my invention is to provide a microscope optical system wherein variations of optical thickness in a transparent object may be determined and wherein positive variation may be easily distinguished from negative variation.

Another object of my invention is to provide a means and method of converting a conventional microscope into a microscope for viewing transparent objects easily and quickly and without the necessity of extremely accurate positioning of the various parts.

Other and further objects and advantages of my invention will become apparent from the following description when taken in conjunction with the accompanying drawings in which like characters of reference designate corresponding parts throughout the several views, and wherein:

Fig. 1 is a side elevational view of a conventional microscope which is adapted according to my invention to provide a microscope for viewing substantially transparent objects.

Fig. 2 is a schematic perspective view of the lens planes of my phase contrast microscope, illustrating the travel of light through the various planes.

Fig. 3 is an enlarged cross-sectional view of the objective of the microscope illustrated in Fig. 1.

Fig. 4 is an enlarged cross-sectional view of the condenser of the microscope illustrated in Fig. 1.

Fig. 5 is an enlarged top plan view of the condenser stop used in the condenser of the microscope illustrated in Fig. 1.

Fig. 6 is a top plan view of the absorber used in the objective of the microscope illustrated in Fig. 1.

Fig. 7 is a reproduction of the image produced by transparent objects which are viewed by the microscope illustrated in Fig. 1.

Fig. 8 is an enlarged, exaggerated cross-sectional view of the slide containing the objects which produced the image illustrated in Fig. 7, said cross-section being taken along a line on the object corresponding to line 8—8 in Fig. 7.

Fig. 9 is a plot of the amplitude of light in the image vs. the position of the light along line 8—8 in Fig. 7.

Referring now in detail to the embodiment chosen for purpose of illustration, in Fig. 1, I have illustrated a conventional microscope equipped for the above referred to viewing of transparent objects. This microscope includes, as is customary, a base 11, a stage 12, an upright support 13, a body tube 14, an eyepiece 15 and an objective indicated in general by numeral 16. Body tube 14 is conventionally moved up and down for adjustment by fine adjustment wheel 17 and coarse adjustment wheel 18 while stage 12 moves back and forth by stage adjustment wheel 19. Below stage 12 and movable therewith is the condenser denoted generally by numeral 20 and below condenser 20 is reflector 21.

Stage 12 is provided with a customary central opening 22 so that light which is reflected by reflector 21 from an external source (not shown) may pass through condenser 20 to illuminate the usual slide 23 carrying an object retained on stage 12 over opening 22 so that it may be observed by the microscopist.

As best seen in Fig. 4, condenser 20 is modified but includes the usual condenser cylinder 24 carried by movable support 25 which is moved up and down with respect to stage 12 by condenser adjustment wheel 26. The upper end of cylinder 24 is provided with a lens supporting member 27 which in turn retains upper condenser lens 28. The lower lens 29 of the condenser 20 is carried within the upper end of cylinder 24 adjacent lens 28 and is retained in place by a spacer ring 30 which threadably engages the inner periphery of cylinder 24.

According to my invention, below spacer ring 30 is a central image forming means which is spaced by spacer ring 30 in a position substantially in the focal plane of lenses 28 and 29. In the present embodiment of my invention, I have illustrated for this central image forming means an opaque stop 31 which is disc-shaped, as shown in Fig. 5, and provided with an aperture such as a slit 32 which may or may not be off the optical axis in a lateral plane. As will be made more apparent hereinafter, the opening means or aperture may be a small circular opening on or out of the optical axis.

Stop 31 abuts the lower edge of spacer ring 30 and is firmly held thereagainst by a retaining ring 33 so that it may at all times be substantially at the focus of the condenser lenses; but, contrary to the prior art, the tolerances for the positioning of stop 31 as to lateral location are not stringent. It is apparent that the length spacer ring 30 determines the spacing of stop 31 from lens 29 and therefore this length should be precalculated to place stop 31 at its proper position. With the exception noted above, other positions of condenser 20 are of conventional construction.

Light emanating from the object or specimen on slide 23, which light provides the means by which the specimen is observed, passes up through the objective 16 which, as seen in Fig. 3, comprises the usual objective cylinder 34 within which the carrying rings 35, 36 and 37 of lenses 38, 39 and 40 are mounted. A conventional protective sleeve 41 threadably engages objective cylinder 34 and holds retaining ring 35 in place.

According to my invention, a differential light absorbing means is provided substantially in the focal plane of the objective lenses. This light absorbing means in the illustrated embodiment of my invention is a circular disc 42 provided with a means which uniformly varies the transmission factor of the same such that the image of the region of variable transmission fills the exit pupil of the optical system. The latter means in this embodiment is illustrated as coating 43 applied to the bottom of disc 42 in a manner which will be described more fully hereinafter.

Disc 42 is positioned in the focal plane of the objective lenses 38, 39 and 40 by means of a spacer sleeve 44 which abuts the uppermost carrying ring 37, as shown in Fig. 3. A second spacer ring 45 is urged down against disc 42 by the usual diaphragm member 46.

It is thus seen that light from the object on slide 23 passes through lenses 38, 39 and 40, thence through disc 42 to the eyepiece 15. The eyepiece 15 is of usual construction having a lower lens 46 and an upper lens 47 located at the respective ends of the eyepiece cylinder 48.

For purpose of description, Fig. 2 is a simplified schematic illustration of the travel of light through the lens planes together with the orientation of the absorbing means and the central image forming means. In Fig. 2, numeral 47' denotes the focal plane of the condenser 20 on which plane the central image forming means is located, the means being illustrated by lateral slit 48' which corresponds to slit 32. For convenience, light rays are illustrated as emanating from a point on slit 48' and passing through the plane 49 of the condenser 20, the plane 50 of the slide 23, the principal plane 51 of the objective 16 to the focal plane 52 of the objective 16, on which latter plane the central image 53 is formed and the differential absorbing means is located. The optical axis 54 naturally passes perpendicularly through the aforesaid planes in an imaginary axial plane 55 which is parallel to the slit 48'.

According to my invention, the transmission factor variation of the absorbing means is determined as a function of the sine of the angle subtended by a plane 56 passing through a particular line increment of area of the absorbing means to intersect axis 54 and objective plane 51. In Fig. 2, the line increment of area is illustrated as line A—B while the angle subtended between plane 56 and the axial plane 55 is illustrated as angle $\alpha$. At any point, for example, point C on line A—B, the amplitude transmission, i.e. the fractioned amplitude of light which passes the absorbing means, should vary from line increment of area to line increment of area across plane 53 linearly with the sine of angle $\alpha$ or:

(1) $\qquad T = k + d \sin \alpha$ where $k$ and $d$ are constants chosen to make the entire exit pupil the region of applicability of Equation 1, T is the amplitude transmission, the square root of the transmission factor, $I/I_0$, where $I_0$ is the intensity of light incident on the absorber and I is the intensity of light transmitted. The angle $\alpha$ is considered positive on one side of axial plane 55 and negative on the other side thereof. Hence, the transmission factor $T_t$ of the differential forming means may be expressed as:

(2) $\qquad T_t = (k + d \sin \alpha)^2$

If the central image is a point, it may be located anywhere in the plane and may lie on the optic axis. If the central image is a slit, it should be oriented approximately parallel to line A—B, or the direction along which the transmission factor of the absorber does not change, by orientation of slit 48.

Contrary to the prior art, the absorbing means need not introduce any phase shift; but, if it does, the phase shift should vary from point to point linearly with T.

When an absorbing means is produced and installed according to my invention in an optical system together with the properly oriented central image forming means, the amplitude at any point in the image will vary linearly with derivative or space rate of change of optical thickness in the object at the corresponding point in the direction perpendicular to line A—B. The sign and magnitude of the proportionality factor depends on the constants $k$ and $d$.

To construct an absorbing means, such as disc 42, a properly exposed photographic plate will serve; however, metal or other absorbing material evaporated or sputtered onto glass will serve as coating 43 on a disc 42 made of glass.

To get coating 43 to vary, as shown in Fig. 6, i.e. according to the formula $T_t = (k + d) \sin \alpha)^2$, the glass can be moved at properly varying speeds under a slit while the metal is evaporated or sputtered from the opposite side of the slit. An alternative method of obtaining a proper coating 43 is to vary the size of the slit opening as the glass is moved under it.

Still another method of obtaining coating 43 is to pass or oscillate the glass in the direction in which there is no variation of transparency while sputtering or evaporating a metal through a wedge-shaped slit of suitable design.

The light-absorbing means must have a transmission factor that varies along one direction in a prescribed way. One way of accomplishing this, as stated above, is to expose a photographic plate to light, a strong exposure (light intensity times time of exposure) where the transmission factor should be small, a weak exposure where the transmission factor should be large. Another is to deposit a light-absorbing material (aluminum, silver, or other metal or alloy, for example) onto a glass plate in varying amounts at different places by evaporating or sputtering in a partial vacuum. A dense film of metal should be deposited where the transmission factor should be small, a tenuous film where the transmission factor should be large. The amount of metal deposited on a glass plate depends on its "exposure" to the source of metal molecules, the hot evaporating metal or the sputtering cathode. "Exposure" is here understood to be time of exposure times rate of deposition of metal per unit area, and is closely analogous to exposure of the photographic film. Four methods of producing the required varying exposure follow and any of them can be applied to both exposure of photographic plates and to depositing metal onto glass. The following are examples:

(1) Between the source of light or metal a stop containing a uniform slit should be inserted. This slit should be arranged parallel to the direction in which there is to be no variation in transmission factor. When the source is turned on, the slit should be moved with respect to the plate to be exposed (or vice versa) perpendicular to its length at a varying velocity that will produce the desired exposure as described below. A properly shaped cam driven by a constant speed motor is one way to obtain the drive. An oscillatory motion that will repeat the above procedure many times can smooth out variations in the source.

The exposure will be at every place inversely proportional to the velocity and the relation between exposure and transmission factor will have to be separately obtained. If this relation is not available from theoretical considerations or from past experience it can be obtained as follows: the slit should be moved over an experimental plate with some known velocity pattern and the transmission factor should be measured with a photoelectric densitometer. A densitometer measures transmission factor. It may be calibrated in "density" units.

By definition "density" is the negative of the logarithm to base 10 of the transmission factor. This set of measurements relates exposure to transmission factor.

After an absorber is made, its transmission factor can be measured with a suitable densitometer, and if the transmission factor-position relation is not the desired one, then the above mentioned cam can be corrected and another absorber made.

(2) The arrangement in Example No. 1 can be used to expose the plate except that the slit is made to move relative to the plate at a uniform velocity and the slit width is varied by a suitable cam or linkage to obtain the desired exposure.

(3) Instead of a slit, the edge of the stop can be made to progressively uncover the plate.

(4) A properly tapered slit oriented in the direction along which the transmission factor is to vary can be moved at uniform velocity in the direction that no variation of transmission factor is desired. Here the shape of the slit rather than a cam determines the exposure-position relation.

In Examples Nos. 2, 3 and 4, procedures analogous to that outlined in Example No. 1 can be used to obtain the exposure-transmission factor relation. Also analogous procedures may be used to correct errors in the cams or in Example No. 4, the slit shape.

The absorbing means formed according to these methods would be of uniform transmission factor parallel line increments, for example, line A—B would be of uniform transmission factor throughout and each other line increment parallel thereto would be of uniform transmission factor. On the other hand, each of the line increments would vary in transmission coefficient with respect to each other according to Formula 2, thus the increments in a line perpendicular to the uniform density increment lines would be of gradually increasing, or decreasing, transmission factor.

In Fig. 7 is a reproduction of a photograph of four transparent squares of calcium fluoride approximately 50 microns wide and one-fourth micron in optical thickness. In Fig. 7, the light portions illustrated by numeral 57 indicate an increase in optical thickness of the transparent objects in a direction from right to left while the dark portions 58 indicate a decrease in optical thickness; thus, it may be predicted with accuracy that in the same direction what is being viewed has a cross-section such as is illustrated in Fig. 8, the cross-section corresponding to the cross-section of the object as reproduced along line 8—8 of the image in Fig. 7. Of course, by rotating the absorbing means and central image forming means 90°, or, for that matter the slide 12, 90°, the cross-section at right angles to line 8—8 may be ascertained.

It is now apparent that to completely examine the transparent object, both disc 42 and stop 31 should be rotated in the same direction through the same arc with respect to the object or specimen. Numerous optical lens rotating arrangements are disclosed by the prior art and thus none is illustrated herein.

It will be obvious to those skilled in the art that many variations may be made in the single embodiment chosen for purpose of illustration without departing from the scope of my invention as defined by the appended claims.

I claim:

1. In an optical system for viewing substantially transparent objects having a condenser for projecting light onto an object and a means for viewing said object, said means including an objective and an eyepiece, the combination of a stop having an aperture located substantially in the focal plane of said condenser, a light absorbing means located substantially in the focal plane of said objective, said light absorbing means having a smoothly varying transmission factor along at least one axis thereof for partially absorbing light projected from said condenser via said aperture onto said object and thence through said objective whereby the light received through said eyepiece defines the optical thickness of said object, the image of said light absorbing means filling the exit pupil of the optical system.

2. In an optical system for viewing substantially transparent objects, said system having a condenser for projecting light onto an object and means including an objective for viewing said object, the combination of a light absorbing means located substantially in the focal plane of the objective, and opaque means located substantially in the focal plane of said condenser provided with a linear aperture through which said light passes, said light absorbing means being provided with a plurality of parallel increments of area of uniform transmission factor, said increments of area of uniform transmission factor also being substantially parallel to said linear aperture, and each of said increments of area varying in transmission factor from other of said increments of area throughout the area of said light absorbing means, the image of said light absorbing means filling the exit pupil of the optical system.

3. The structure claimed in claim 2 wherein the variation in transmission factor of said increments of area of uniform transmission factor is defined by the formula:

$$T_f = (k + d \sin \alpha)^2$$

where $T_f$ is the transmission factor of individual of said increments of area of uniform transmission factor, $k$ and $d$ are constants, and $\alpha$ is an angle subtended by the optical axis and by a plane passing through said individual of said increments of area and intersecting said optical axis at the plane of the object.

4. In an optical system having an objective lens and an eyepiece arranged along an optical axis to view an object positioned within said optical system, the combination of a light absorbing means located between said objective lens and said eyepiece substantially in the focal plane of said objective lens, said light absorbing means being characterized by a plurality of increments of area of uniform transmission factor lying parallel to each other and being sufficiently extensive that its imaged area in the exit pupil fills said exit pupil, said increments of area progressively increasing in transmission factor along an axis perpendicular to said increments of area, and means for forming a central image of parallel dispersement with said increments of area on said absorbing means.

5. The structure as claimed in claim 4 wherein the progressively increasing transmission factor of said increments of area is a substantially smooth function of the angle subtended by the optical axis and by a plane passing through said individual increments of area and intersecting said optical axis at the plane of the object.

6. The structure claimed in claim 5 wherein said function is defined as: $(k + d \sin \alpha)^2$, where $k$ and $d$ are constants and $\alpha$ is said angle.

7. A microscope of the class having a condenser, a stage, an objective and an eyepiece wherein an object on a slide on said stage is viewed through said eyepiece and objective while being illuminated by light from said condenser, the combination therewith of an opaque disc-shaped stop positioned in the focal plane of said condenser, a spacer ring connected to said condenser between one lens of said condenser and said stop, said stop being provided with a linear slit in a plane perpendicular to the optical axis of said microscope, a substantially transparent disc carried by said objective, a spacer ring between one lens of said objective and said disc to position said disc on the focal plane of said objective, and a light absorbing coating on said disc, said coating being characterized by parallel increments of area of uniform transmission factor, said increments of area lying parallel to said slit, the transmission factor of said increments of area increasing along said disc conforming to the formula:

$$T_f = (k + d \sin \alpha)^2$$

where $T_f$ is a transmission factor of an individual increment of area of uniform transmission factor, $k$ and $d$ are constants sufficient that the image of said coating in the exit pupil of the optical system fills the entire exit pupil and $\alpha$ is an angle subtended by the optical axis and by a plane passing through said individual increment of area and intersecting said optical axis at the plane of the object.

References Cited in the file of this patent

UNITED STATES PATENTS

| | | |
|---|---|---|
| 2,384,209 | Sukumlyn | Sept. 4, 1945 |
| 2,384,578 | Turner | Sept. 11, 1945 |
| 2,427,689 | Osterberg et al. | Sept. 23, 1947 |
| 2,472,991 | Sukumlyn | June 14, 1949 |
| 2,637,243 | Marx | May 5, 1953 |
| 2,675,737 | Bennett | Apr. 20, 1954 |
| 2,676,114 | Barkley | Apr. 20, 1954 |
| 2,687,670 | Locquin | Aug. 31, 1954 |
| 2,732,759 | Osterberg | Jan. 31, 1956 |

FOREIGN PATENTS

| | | |
|---|---|---|
| 636,168 | Germany | Oct. 7, 1936 |